US010767763B2

(12) United States Patent
Nowatari (10) Patent No.: US 10,767,763 B2
(45) Date of Patent: Sep. 8, 2020

(54) SEAL STRUCTURE AND MANUFACTURING METHOD THEREOF

(71) Applicant: IIDA Co., Ltd., Kanagawa (JP)

(72) Inventor: Shuichi Nowatari, Kanagawa (JP)

(73) Assignee: IIDA CO., LTD., Yokohama-Shi (JP)

( * ) Notice: Subject to any disclaimer, the term of this patent is extended or adjusted under 35 U.S.C. 154(b) by 0 days.

(21) Appl. No.: 16/318,383

(22) PCT Filed: Oct. 11, 2017

(86) PCT No.: PCT/JP2017/036850
§ 371 (c)(1),
(2) Date: Jan. 17, 2019

(87) PCT Pub. No.: WO2018/083954
PCT Pub. Date: May 11, 2018

(65) Prior Publication Data
US 2019/0264815 A1    Aug. 29, 2019

(30) Foreign Application Priority Data
Nov. 1, 2016 (JP) .................... 2016-214387

(51) Int. Cl.
*F16J 15/32* (2016.01)
*F16J 15/3292* (2016.01)
(Continued)

(52) U.S. Cl.
CPC ........... *F16J 15/3292* (2013.01); *F16J 15/24* (2013.01); *F16J 15/328* (2013.01)

(58) Field of Classification Search
CPC .... F16J 15/3224; F16J 9/20; F16J 9/12; F16J 15/3288
See application file for complete search history.

(56) References Cited

U.S. PATENT DOCUMENTS 1,407,570 A * 2/1922 Peirce ................... F16B 13/066
411/17
1,666,805 A * 4/1928 Williams .............. F16B 13/065
411/18
(Continued)

FOREIGN PATENT DOCUMENTS

JP    2005-221020 A    8/2005
JP    2005-282370 A    10/2005
(Continued)

OTHER PUBLICATIONS

The International Search Report and Written Opinion for PCT/JP2017/036850 dated Jan. 9, 2018.

*Primary Examiner* — Vishal A Patel
(74) *Attorney, Agent, or Firm* — Kenealy Vaidya LLP (57) ABSTRACT

An annular seal member 2 is formed by overlapping, in the axial direction D1, a plurality of ring-shape parts 3 which are closed or unclosed when viewed in a radial direction D2 orthogonal to the axial direction D1 of the annular seal member 2. A seal groove 5 has a groove bottom 51 with an outer diameter R51 that increases along the axial direction D1. The inner periphery 22 of the annular seal member 2 contacts the groove bottom 51, and the inner diameter R22 of the inner periphery 22 increases as the outer diameter R51 of the groove bottom 51 increases. By this means, the outer diameter R21 of the outer periphery 21 increases, and the side of the outer periphery 21 of the annular seal member 2 that has a smaller outer diameter R21 does not contact the inner peripheral wall 61 of an inner peripheral wall member 6, and the side of the outer periphery 21 of the annular seal member 2 that has a greater outer diameter R21 does contact the inner peripheral wall 61 of the inner peripheral wall member 6.

4 Claims, 9 Drawing Sheets

(51) Int. Cl.
    *F16J 15/328*     (2016.01)
    *F16J 15/24*     (2006.01)

(56) References Cited

U.S. PATENT DOCUMENTS

| | | | | |
|---|---|---|---|---|
| 1,965,417 | A * | 7/1934 | Kurth | F16J 9/04 |
| | | | | 92/206 |
| 3,162,185 | A * | 12/1964 | Knoblock | F01L 3/08 |
| | | | | 123/188.6 |
| 3,549,155 | A * | 12/1970 | Ward | F04B 39/042 |
| | | | | 277/455 |
| 4,235,480 | A * | 11/1980 | Olschewski | E21B 10/25 |
| | | | | 175/372 |
| 4,333,661 | A * | 6/1982 | Merrell | F02G 1/0445 |
| | | | | 277/458 |
| 5,201,530 | A | 4/1993 | Kelch et al. | |
| 6,305,265 | B1 * | 10/2001 | Bingham | F04B 15/08 |
| | | | | 277/452 |
| 7,556,295 | B2 * | 7/2009 | Holzheu | A01K 7/027 |
| | | | | 285/147.1 |
| 2009/0295099 | A1 * | 12/2009 | Hassen | F16J 15/3228 |
| | | | | 277/565 |

FOREIGN PATENT DOCUMENTS

| | | |
|---|---|---|
| JP | 2009-539038 A | 11/2009 |
| JP | 2017-075638 A | 4/2017 |

* cited by examiner

SEAL STRUCTURE AND MANUFACTURING METHOD THEREOF

This application is a U.S. national phase filing under 35 U.S.C. § 371 of PCT Application No. PCT/JP2017/036850, filed Oct. 11, 2017, and claims priority under 35 U.S.C. § 119 to Japanese patent application number JP2016-214387 filed on Nov. 1, 2016, the entireties of which are incorporated herein by reference.

TECHNICAL FIELD

The present invention establishes a seal structure that seals an internal space formed by an inner peripheral wall member and a shaft member by an annular seal member.

BACKGROUND ART

The seal structure by an annular seal member is used in various fields such as valves, hydraulic devices, and the engine of an internal combustion engine. Patent Document 1 discloses, in relation to the engine of an internal combustion engine, a seal structure by a upper and lower two seal rings which are fit in ring grooves of a piston which is sloped upwards so as to approach a cylinder head as approaching an inner peripheral wall of the cylinder.

Patent Document 1: Japanese Unexamined Patent Application, Publication No. 2005-282370

DISCLOSURE OF THE INVENTION

Problems to be Solved by the Invention

The seal structure disclosed in Patent Document 1 makes contact with an outer periphery of seal ring and the inner peripheral wall of a cylinder, with the object of reducing the consumed amount of oil. However, the seal structure disclosed in Patent Document 1 is a complicated seal structure in that, on the inner circumferential side, the upper surface of an upper seal ring and the corner of the upper surface of the ring groove make line contact at an inner circumferential side, the lower surface of the upper seal ring and the corner of the upper surface of the lower seal ring make line contact, and corner of the lower surface of the lower seal ring and the lower surface of the ring groove make line contact.

Furthermore, in order to configure the above-mentioned complicated seal structure, mechanical processing is necessary that removes more of the inner circumferential side than the outer circumferential side for the upper surface of an annular member having a substantially constant thickness, and removes more of the outer circumferential side than the inner circumferential side for the lower surface of the annular member having a substantially constant thickness. Concerning the assembly, when placing the upper seal ring and lower seal ring into the ring grooves, the upper seal ring and lower seal ring must be fit into the ring grooves at different twist angles relative to a reference surface which is vertical to the piston axis, and thus effort is required in manufacture and assembly.

Therefore, the present invention has an object of providing a seal structure that can generate high contact pressure by establishing the outer periphery of the annular seal member and inner peripheral wall member in a contact state close to line contact, thereby maintaining high sealing property, and by a relatively simple machining method, as well as a manufacturing method thereof.

Means for Solving the Problems

The present invention relates to a seal structure comprising an annular seal member of ring shape having an outer periphery and an inner periphery; a shaft member having a seal groove in which a side of the inner periphery of the annular seal member is disposed; an inner peripheral wall member having an internal space encircled by the inner peripheral wall, and arranging in the internal space the shaft member in which the annular seal member is disposed in the seal groove; in which the annular seal member is formed by a plurality of ring-shaped parts, which are closed or unclosed when viewed in a radial direction orthogonal to an axial direction of the annular seal member, overlapping in the axial direction; in which the seal groove has a groove bottom in which an outer diameter increases along the axial direction; the inner periphery of the annular seal member abuts the groove bottom, and the inner circumferential diameter of the inner periphery increases following an increase in outer diameter of the groove bottom, whereby the outer circumferential diameter of the outer periphery also increases; and in which a side of the outer periphery of the annular seal member having a small outer circumferential diameter does not abut the inner peripheral wall of the inner peripheral wall member, and a side of the outer periphery of the annular seal member having large outer diameter abuts the inner peripheral wall of the inner peripheral wall member.

In addition, the shaft member may include a first main body and a second main body; the first main body may have a first joint at one end face thereof; the second main body may have a second joint which joins to the first joint of the first main body, a groove-bottom forming part of conical shape which connects to the second joint, and in which the outer diameter increases as distancing from the second joint along the axial direction, and a flange part which connects to the groove-bottom forming part, and spreads out in the radial direction so as to be wider than the outer diameter of the groove-bottom forming part; and in a state joining the first joint of the first main body and the second joint of the second main body, the seal groove may be formed by the one end face of the first main body, the groove-bottom forming part of the second main body, and the flange part of the second main body.

Furthermore, the annular seal member may consist of fluororesin.

The present invention relates to a manufacturing method of a seal structure that includes: an annular seal member of ring shape having an outer periphery and an inner periphery; a shaft member having a seal groove in which a side of the inner periphery of the annular seal member is disposed; an inner peripheral wall member having an internal space encircled by the inner peripheral wall, and arranging in the internal space the shaft member in which the annular seal member is disposed in the seal groove, in which the annular seal member is formed by a plurality of ring-shaped parts, which are closed or unclosed when viewed in a radial direction orthogonal to an axial direction of the annular seal member, overlapping in the axial direction; in which the shaft member includes a first main body and a second main body; in which the first main body has a first joint at one end face thereof; in which the second main body has a second joint which joins to the first joint of the first main body, a groove-bottom forming part of conical shape which connects to the second joint, and in which the outer diameter increases as distancing from the second joint along the axial direction, and a flange part which connects to the groove-bottom forming part, and spreads out in the radial direction so as to be wider than the outer diameter of the groove-bottom forming part; and the seal groove has a groove bottom in which an outer diameter increases along the axial direction, the method comprising: forming the seal groove by the one end face of the first main body, the groove-bottom forming part of the second main body and the flange part of the second main body by way of joining the first joint of the first main body and the second joint of the second main body, and fitting the annular seal member in which an inner circumferential diameter of the inner periphery is substantially uniform along the axial direction over the groove-bottom forming part from a side of the second joint; whereby the inner periphery of the annular seal member is made to abut the groove bottom, along with the inner circumferential diameter of the inner periphery being made to increase following an increase in outer diameter of the groove bottom, as well as increasing the outer circumferential diameter of the outer periphery; and whereby a side of the outer periphery of the annular seal member having small outer circumferential diameter is not made to abut the inner peripheral wall of the inner-peripheral wall member, and a side of the outer periphery of the annular seal member having large outer circumferential diameter is made to abut the inner peripheral wall of the inner-peripheral wall member.

Furthermore, the annular seal member may consist of fluororesin.

Effects of the Invention

According to the present invention, it is possible to provide a seal structure that can generate high contact pressure by establishing the outer periphery of the annular seal member and inner peripheral wall member in a contact state close to line contact, thereby maintaining high sealing property, and by a relatively simple machining method, as well as a manufacturing method thereof.

PREFERRED MODE FOR CARRYING OUT THE INVENTION

Embodiment

Figure 1:
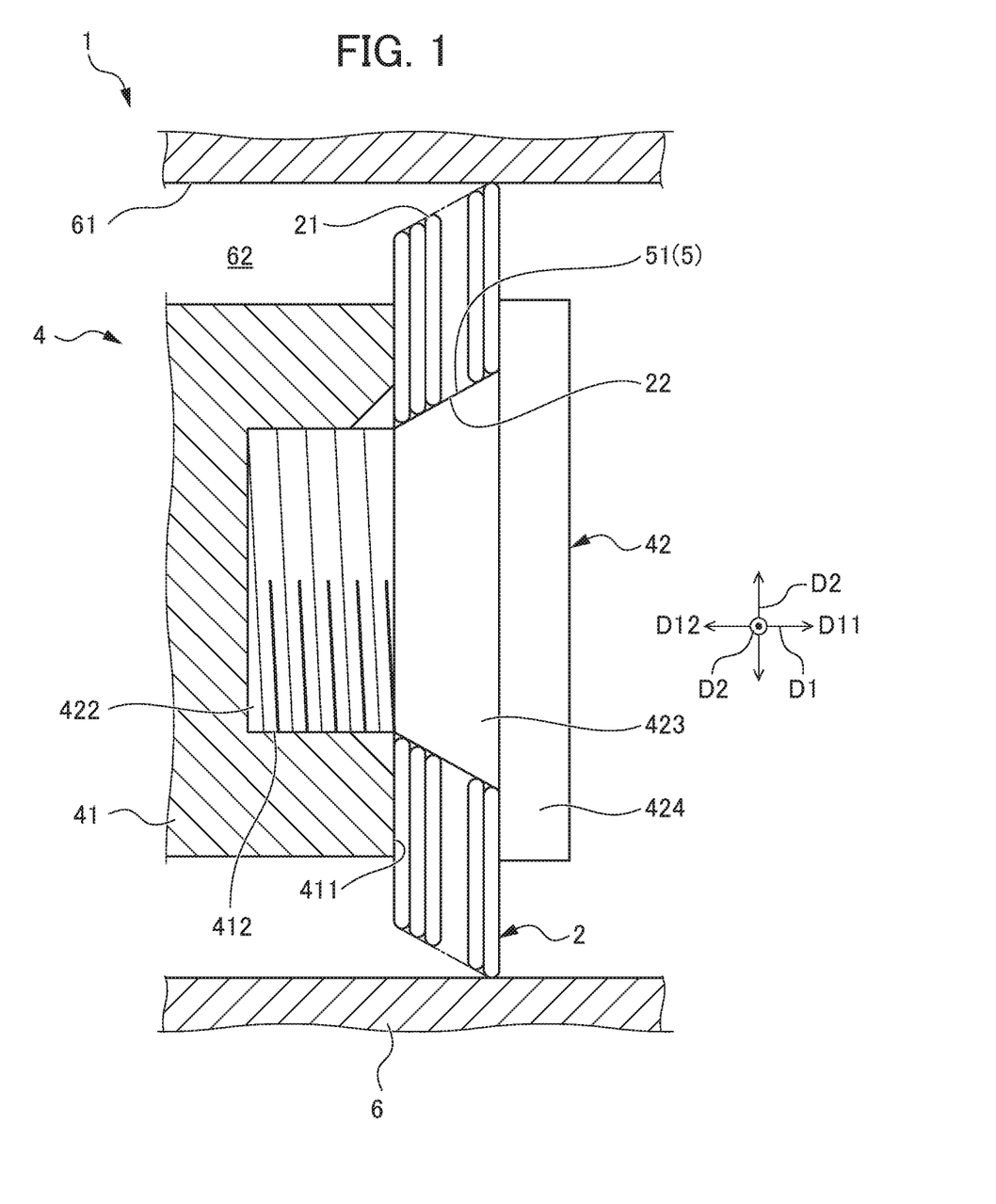
FIG. 1 is a longitudinal cross-sectional view of a seal structure 1 according to an embodiment of the present invention.
Figure 2:
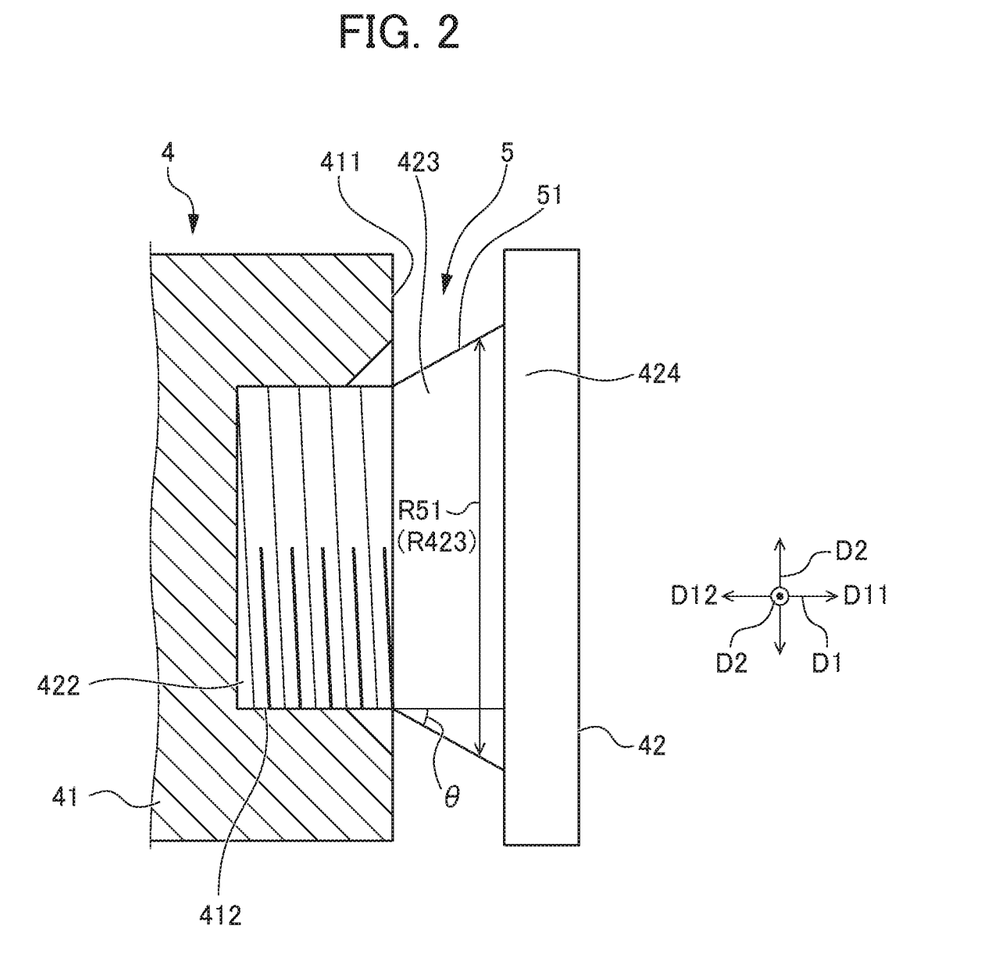
FIG. 2 is a longitudinal cross-sectional view showing a shaft member 4 in a state virtually excluding an annular seal member 2.
Figure 3A:
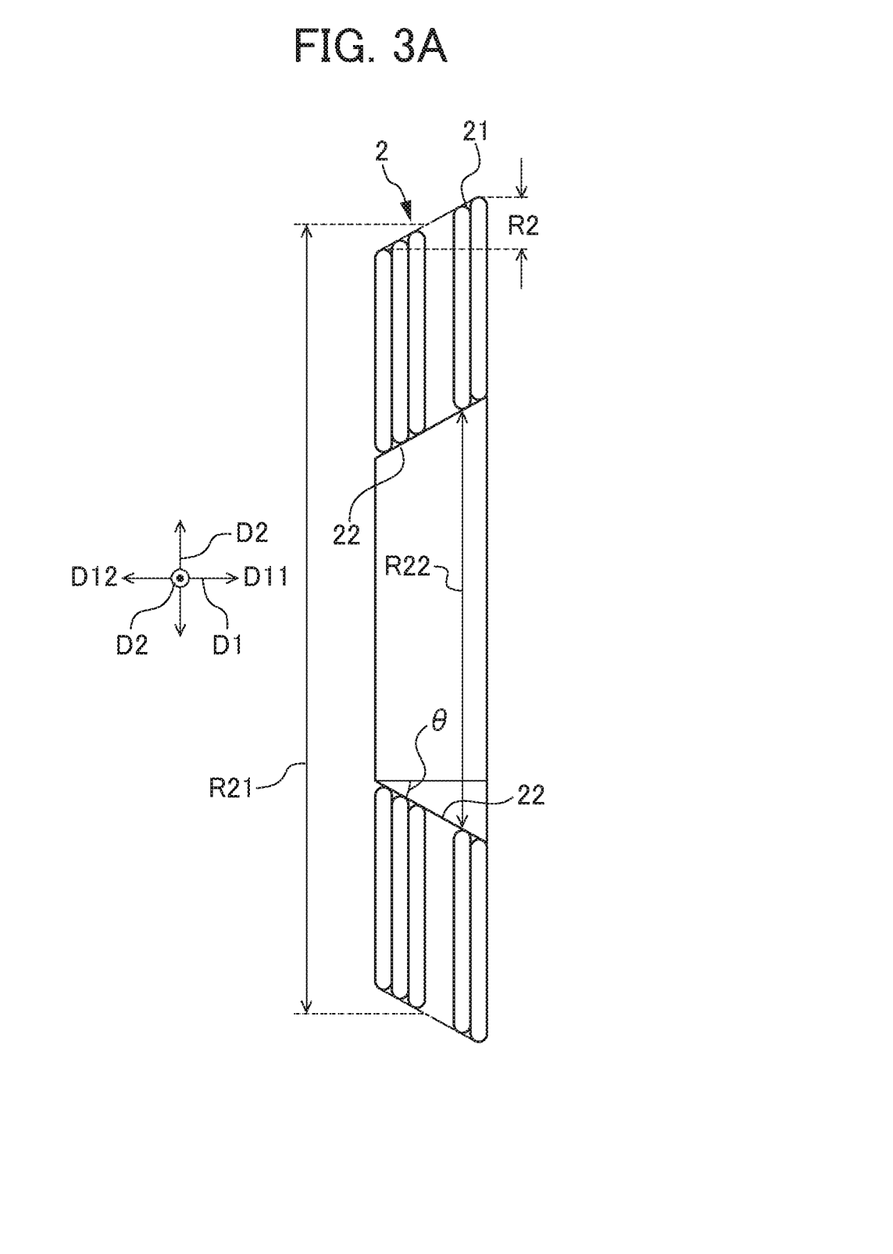
FIG. 3A is a longitudinal cross-sectional view virtually showing only the annular seal member 2 in a state arranged in a seal groove 5 of the shaft member 4.
Figure 3B:
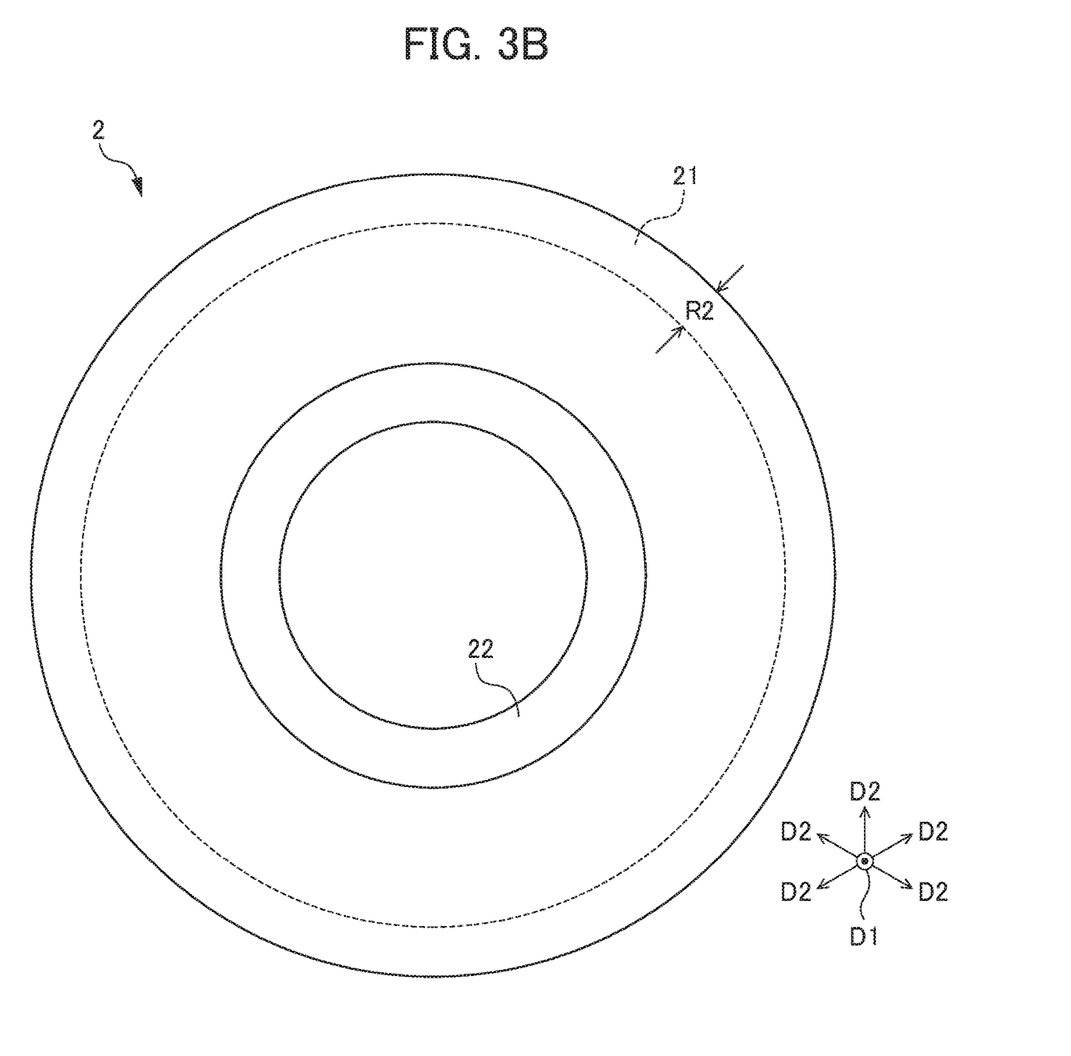
FIG. 3B is a right side view virtually showing only the annular seal member 2 in a state arranged in the seal groove 5 of the shaft member 4.
Figure 4A:
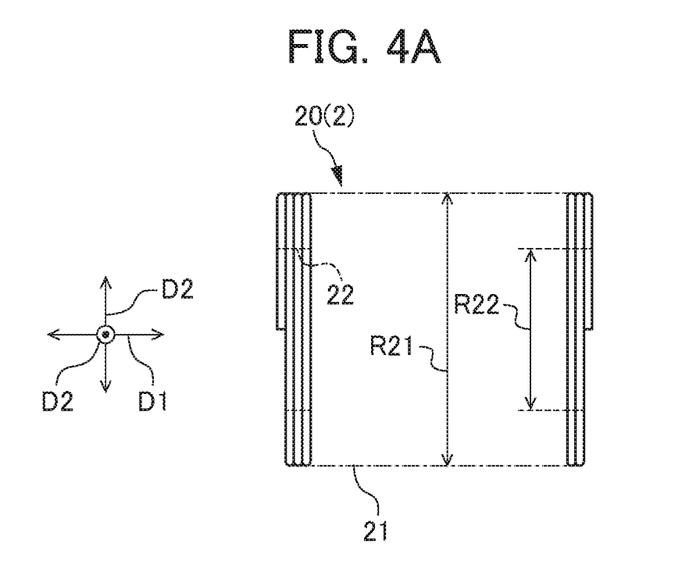
FIG. 4A is a longitudinal cross-sectional view showing the annular seal member 2 in a state not arranged in the seal groove 5 of the shaft member 4.
Figure 4B:
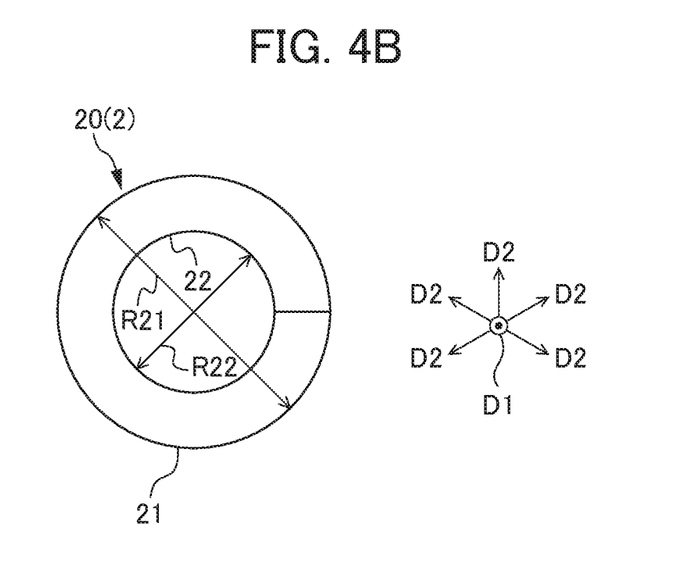
FIG. 4B is a right-side view showing the annular seal member 2 in a state not arranged in the seal groove 5 of the shaft member 4.
Figure 5:
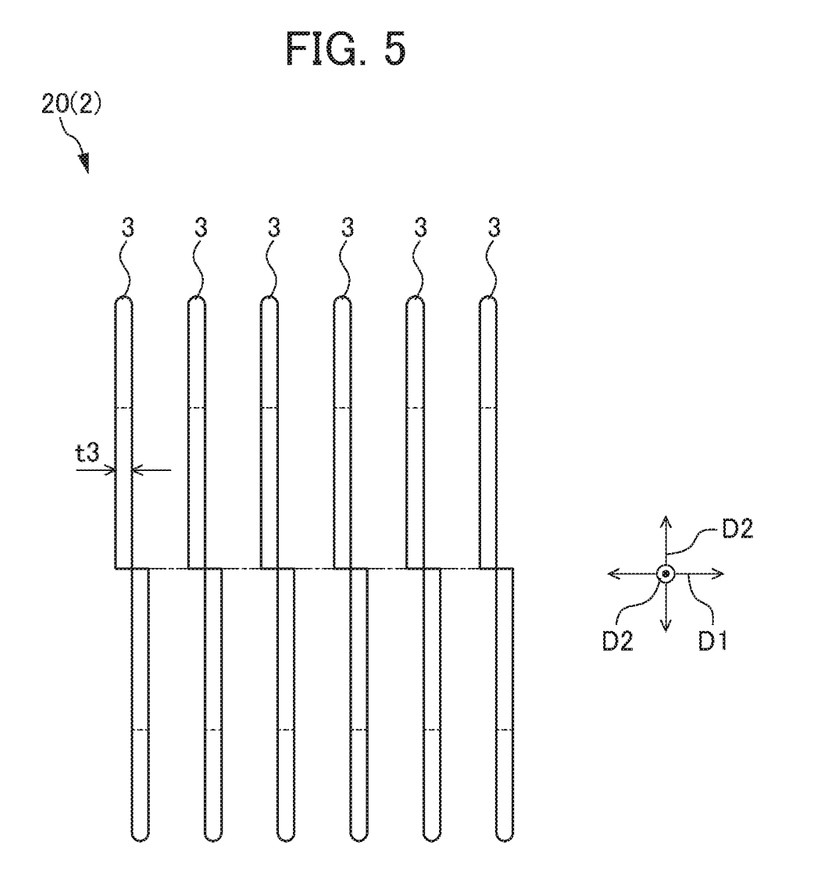
FIG. 5 is a view conceptually showing the configuration of the annular seal member 2.

A seal structure 1 according to an embodiment of the present invention will be explained by referencing the drawings. FIG. 1 is a longitudinal cross-sectional view of the seal structure 1 according to the embodiment of the present invention. FIG. 2 is a longitudinal cross-sectional view showing a shaft member 4 in a state virtually excluding the annular seal member 2. FIG. 3A is a longitudinal cross-sectional view virtually showing only the annular seal member 2 in a state arranged in a seal groove 5 of the shaft member 4. FIG. 3B is a right-side view virtually showing only the annular seal member 2 in a state arranged in the seal groove 5 of the shaft member 4. FIG. 4A is a longitudinal cross-sectional view showing the annular seal member 2 in a state not arranged in the seal groove 5 of the shaft member 4. FIG. 4B is a right-side view showing the annular seal member 2 in a state not arranged in the seal groove 5 of the shaft member 4. FIG. 5 is a view conceptually showing the configuration of the annular seal member 2.

The seal structure of the present invention can be applied to various technologies such as valves, hydraulic devices and the engine of an internal combustion engine. As shown in FIGS. 1 to 3B, the seal structure 1 of the embodiment includes an annular seal member 2 of ring shape having an outer periphery 21 and inner periphery 22, a shaft member 4, and an inner peripheral wall member 6. The shaft member 4, annular seal member 2 and inner peripheral wall member 6 have an axial direction D1 and a radial direction D2. The axial direction D1 is a longitudinal direction of the shaft member 4. The radial direction D2 is a direction orthogonal to the axial direction D1, and extends radially from the axial direction D1.

(Shaft Member 4)

As shown in FIG. 2, the shaft member 4, at an outer periphery thereof, has a seal groove 5 into which a side on the inner periphery 22 of the annular seal member 2 is arranged. The seal groove 5 has a groove bottom 51 at which the outer diameter R51 increases along the axial direction D1. It should be noted that, for the axial direction D1, the direction in which the outer diameter R51 of the groove bottom 51 increases is referred to as a first axial direction D11, and the opposite direction thereto is referred to as a second axial direction D12. In the longitudinal cross-sectional view, the angle θ formed by the groove bottom 51 relative to the axial direction D1, for example, is 10 to 30 degrees.

The shaft member 4 includes a first main body 41 and a second main body 42. The first main body 41 has a first joint 412 at one end face 411 thereof. The first joint 412 of the present embodiment consists of a female threaded part.

The second main body 42 has a second joint 422 which joins with the first joint 412 of the first main body 41, a groove bottom forming part 423, and a flange part 424. The second joint 422 of the present embodiment consists of a male threaded part. The groove bottom forming part 423 is a conical part that connects to the second joint 422 and at which the outer diameter R423 increases as distancing from the second joint 422 towards the first axial direction D11 along the axial direction D1. The flange part 424 is a part that connects to the groove bottom forming part 423, and spreads out in the radial direction D2 so as to be wider than the outer diameter R423 of the groove bottom forming part 423.

As shown in FIGS. 1 and 2, in a state joining the first joint 412 of the first main body 41 and the second joint 422 of the second main body 42, the seal groove 5 is formed by one end face 411 of the first main body 41, the groove-bottom forming part 423 of the second main body 42, and the flange part 424 of the second main body 42.

(Inner Peripheral Wall Member 6)

The inner peripheral wall member 6 has an internal space 62 encircled by an inner peripheral wall 61. The inner peripheral wall 61 and internal space 62 extend in the axial direction D1. A cross section of the inner peripheral surface of the inner peripheral wall 61 is circular form. Therefore, the cross section of the outer circumference of the internal space 62 is also circular form. The shaft member 4 at which the annular seal member 2 is arranged in the seal groove 5 is disposed in the internal space 62.

(Annular Seal Member 2)

The annular seal member 2 forms a spiral shape by a plurality of ring shaped parts 3, which are unclosed when view in the radial direction D2, continuing in the axial direction D1. The ring shaped parts 2 which are unclosed when viewed in the radial direction D2 are a part of a virtual ring shape which does not link in a ring shape, as shown in FIGS. 4A to 5B. The cross section of the ring shaped part 3 is rectangular shape, for example. The thickness t3 (refer to FIG. 5) in the axial direction D1 for the ring-shaped part 3 of rectangular shape is 1 to 3 mm, for example. In FIG. 5, the dashed line is a virtual line for showing the link between adjacent ring-shaped parts 3.

As shown in FIGS. 1 to 3B, the inner periphery 22 of the annular seal member 2 abuts the groove bottom 51 of the seal groove 5 in the shaft member 4, and the inner circumferential diameter R22 of the inner periphery 22 increases with the increase in outer diameter R51 of the groove bottom 51. The outer circumferential diameter R21 of the outer periphery 21 thereby also increases. R2, which is ½ of the difference calculated by subtracting the inner circumferential diameter R22 of the inner periphery 22 from the outer circumferential diameter R21 of the outer periphery 21 (refer to FIGS. 3A and 3B) is 1 to 3 mm, for example.

On the other hand, as shown in FIGS. 4 to 5B, in a state in which the inner periphery 22 of the annular seal member 2 is not abutting the groove bottom 51 of the seal groove 5 of the shaft member 4 (i.e. state in which the annular seal member 2 is separate), the annular seal member 20(2) is in a state in which the inner circumferential diameter R22 of the inner periphery 22 is substantially uniform along the axial direction D1. The inner circumferential diameter R22 of the inner periphery 22 in this state is greater than the outer diameter of the male thread part 422 serving as the second joint, and is smaller than the maximum diameter of the outer diameter R423 of the groove-bottom forming part 423. It should be noted that annular seal member 2 in such a state refers to "annular seal member 20" as appropriate. Such an annular seal member 20 is obtained by cutting a cylindrical material in a spiral shape.

As shown in FIGS. 1 to 3B, the side of the outer periphery 21 of the annular seal member 2 having a small outer circumferential diameter R21 does not abut with the inner peripheral wall 61 of the inner peripheral wall member 6. In addition, the side of the outer periphery 21 of the annular seal member 2 having a large outer circumferential diameter R21 abuts with the inner peripheral wall 61 of the inner peripheral wall member 6. In the axial direction D1, the length by which the outer periphery 21 of the annular seal member 2 abuts the inner peripheral wall 61 of the inner peripheral wall member 6 changes depending on the dimensions, etc. of each constituent element, and also changes depending on settling, etc. of the annular seal member 2.

In the present embodiment, the annular seal member 2 consists of fluororesin. As the fluororesin, PTFE, PFA and FEP are exemplified. The fluororesin is superior in various characteristics such as chemical resistance, electrical insulation property, heat resistance, low friction property (self-lubricating property), and machinability, and compared to metal or common resins, is suited as the annular seal member 2. It should be noted that the resin forming the annular seal member 2 may be a resin other than fluororesin. As the resin other than fluororesin, for example, PEEK, urethane, carbon-containing resin, rubber, various self-lubricating resins, and various engineering plastics can be exemplified. In addition, the annular seal member 2 may be formed from fiber materials. Carbon fiber materials can be exemplified as the fiber material. In addition, the annular seal member 2 may be formed from metal. As the metal, for example, gun metal can be exemplified.

(Manufacturing Method)

Figure 6A:
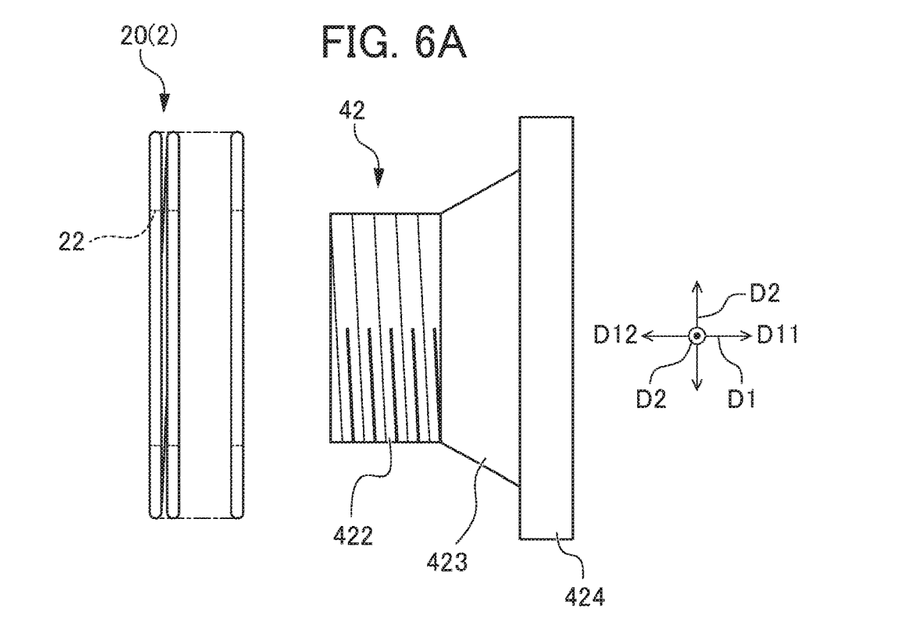
FIG. 6A is a view showing one manufacturing method of the seal structure 1 of the embodiment.
Figure 6B:
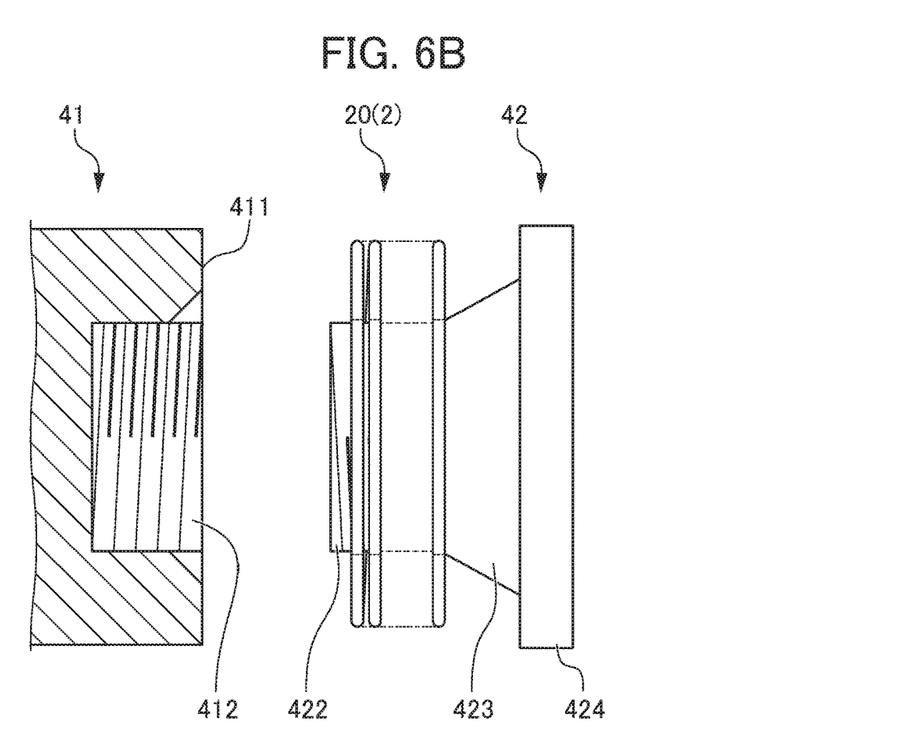
FIG. 6B is a view showing a step after FIG. 6A.
Figure 7A:
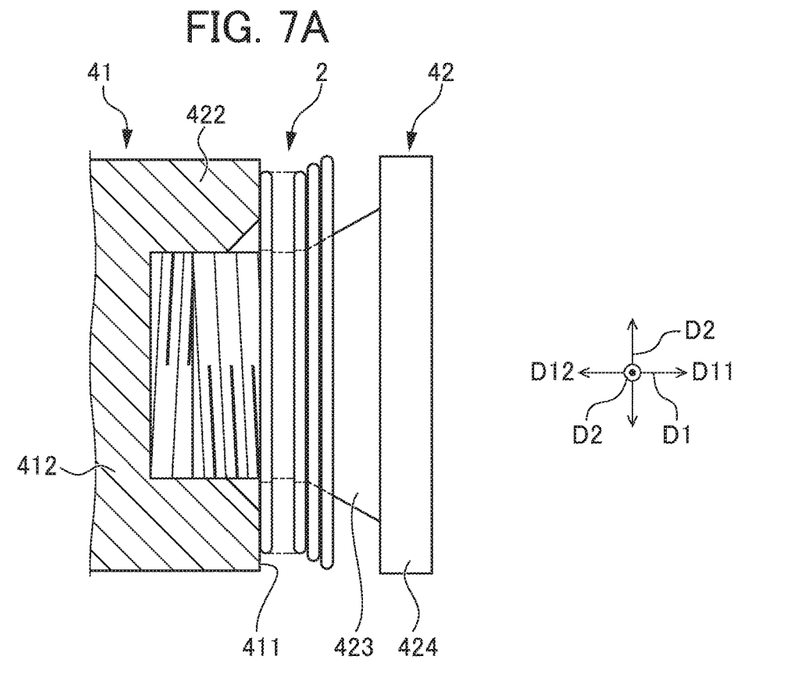
FIG. 7A is a view showing a step after FIG. 6B.
Figure 7B:
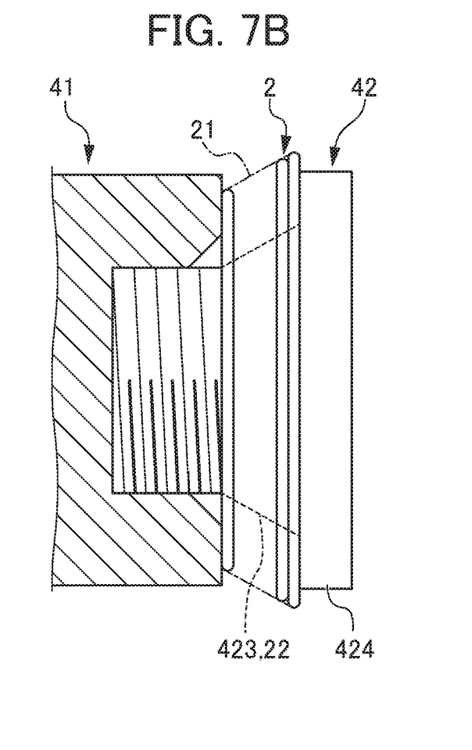
FIG. 7B is a view showing a step after FIG. 7A.

Next, one manufacturing method of the seal structure 1 shown in FIG. 1 will be explained by referencing the drawings. FIG. 6A is a view showing one manufacturing method of the seal structure 1 of the embodiment. FIG. 6B is a view showing the step after FIG. 6A. FIG. 7A is a view showing the step after FIG. 6B. FIG. 7B is a view showing the step after FIG. 7A.

As shown in FIGS. 6A, 4A and 4B, prior to formation of the seal structure 1, the annular seal member 20(2) is in a state in which the inner circumferential diameter R22 of the inner periphery 22 is substantially uniform along the axial direction D1. As shown in FIGS. 6A and 6B, the annular seal member 20 is made to move in a first axial direction D11 towards the groove-bottom forming part 423 of the second main body 42. The annular seal member 20 is fit over the male thread part 422 serving as the second joint, but runs into the groove-bottom forming part 423, and does not move to the first axial direction D11 more than this. Subsequently, by joining (threading together) the female thread part 412 of the first main body 41 and the male thread part 422 of the second main body 42, the seal groove 5 is formed by the one end face 411 of the first main body 41, groove-bottom forming part 423 of the second main body 42, and flange part 424 of the second main body 42. It is thereby possible to cause the annular seal member 2 to fit over the groove-bottom forming part 423 from the side of the male thread part 422.

In the course of this fitting, as shown in FIGS. 7A and 7B, the annular seal member 2 is pressed in the first axial direction D11 to the one end face 411 of the first main body 41, at the end face on the side of the second axial direction D12 thereof. The inner periphery 22 of the annular seal member 2 is made to abut the groove bottom 51. In addition, the inner circumferential diameter R22 of the inner periphery 22 is made to increase following an increase in the outer diameter R51 of the groove bottom 51. Furthermore, the outer circumferential diameter R21 of the outer periphery 21 is made to increase. As a result thereof, the state in which the annular seal member 2 fits over the groove-bottom forming part 423 is formed. As shown in FIG. 1, the side of the outer periphery 21 of the annular seal member 2 having small outer circumferential diameter R21 is not made to abut the inner peripheral wall 61 of the inner peripheral wall member 6, and the side of the outer periphery 21 of the annular seal member 2 having large outer circumferential diameter R21 is made to abut the inner peripheral wall 61 of the inner peripheral wall member 6. The seal structure 1 shown in FIG. 1 can be obtained in this way.

According to the seal structure 1 of the embodiment, for example, the following such effects are exerted. The seal structure 1 of the embodiment is a seal structure 1 includes: the annular seal member 2 of annular shape having the outer periphery 21 and inner periphery 22, the shaft member 4 having seal groove 5 in which the side of the inner periphery 22 of the annular seal member 2 is arranged, and the inner peripheral wall member 6 having the internal space 62 encircled by the inner peripheral wall 61, and arranges in the internal space 62 the shaft member 4 on which the annular seal member 2 is arranged in the seal groove 5. The annular seal member 2 is formed by the plurality of the ring forming parts 3 which are unclosed when viewed in the radial direction D2 orthogonal to the axial direction D1 of the annular seal member 2 overlapping in the axial direction D1, and the seal groove 5 has the groove bottom 51 in which the outer diameter R51 increases along the axial direction D1. The inner periphery 22 of the annular seal member 2 abuts the groove bottom 51, and the inner circumferential diameter R22 of the inner periphery 22 increases following an increase in the outer diameter R51 of the groove bottom 51, whereby the outer circumferential diameter R21 of the outer periphery 21 also increases. The side of the outer periphery 21 of the annular seal member 2 having small outer circumferential diameter R21 does not abut with the inner peripheral wall 61 of the inner peripheral wall member 6, and the side of the outer periphery 21 of the annular seal member 2 having large outer circumferential diameter R21 abuts with the inner peripheral wall 61 of the inner peripheral wall member 6

For this reason, according to the seal structure 1 of the embodiment, since the inner peripheral wall 61 and outer periphery 21 of the annular seal member 2 enter a contact configuration close to line contact, the contact pressure is high, and high sealing property can be obtained. The annular seal member 2 formed by a plurality of ring-shaped parts 3, which are unclosed, overlapping in the axial direction D1 can be manufactured by a relatively easy machining method. The annular seal member 2 formed by the ring-shaped parts 3 which are unclosed overlapping in the axial direction D1 has flexibility compared to a solid form (solid material), and deformation in the radial direction D2 becomes relatively easy. For this reason, it is easy to cause deformation of the inner periphery 22 of the annular seal member 2 following an increase along the axial direction D1 of the outer diameter R51 of the groove bottom 51 of the seal groove 5 in the shaft member 4.

In the seal structure 1 of the embodiment, for the annular seal member 2 formed by a plurality of the ring-shaped part 3, which are unclosed, overlapping in the axial direction D1, deformation to the axial direction D1 is easy. For this reason, the scraping property of oil, etc. existing on the inner peripheral wall 61 of the inner peripheral wall member 6 is high.

In the seal structure 1 of the embodiment, the shaft member 4 includes the first main body 41 and second main body 42, and the first main body 41 has the first joint 412 in one end face 411 thereof. The second main body 42 has the second joint 422 which joins to the first joint 412 of the first main body 41; the groove-bottom forming part 423 of conical shape which connects to the second joint 422 and in which the outer diameter R423 increases as distancing from the second joint 422 along the axial direction D1; and the flange part 424 which connects to the groove-bottom forming part 423, and spreads out in the radial direction D2 so as to be wider than the outer diameter R423 of the groove-bottom forming part 423. In a state joining the first joint 412 of the first main body 41 and the second joint 422 of the second main body 42, the seal groove 5 is formed by the one end face 411 of the first main body 41, groove-bottom forming part 423 of the second main body 42, and flange part 424 of the second main body 42.

For this reason, according to the seal structure 1 of the embodiment, the seal groove 5 is formed by joining the first main body 41 and second main body 42, compared to a form in which the seal groove is formed in the circumferential surface of an integrated shaft member. In addition, by joining the first main body 41 and second main body 42, it is possible to arrange the annular seal member 2 in the seal groove 5. By separating the first main body 41 and second main body 42, it is possible to retrieve the annular seal member 2 which was accommodated in the seal groove 5. For this reason, arranging of the annular seal member 2 in the seal groove 5 of the shaft member 4 and retrieval of the annular seal member 2 from the seal groove 5 are easy.

In the seal structure 1 of the embodiment, the first joint 412 of the first main body 41 is configured from a female thread part, and the second joint 422 of the second main body 42 is configured from a male thread part. For this reason, in the case of the side of the outer periphery 21 of the annular seal member 2 having large outer circumferential diameter R21 being stiff, and the abutting of the outer periphery 21 of the annular seal member 2 to the inner peripheral wall 61 of the inner peripheral wall member 6 becoming insufficient, by performing threading together so that the one end face 411 of the first main body 41 and the flange part 424 of the second main body 42 approach in the axial direction D1, it is possible to cause the outer periphery 21 of the annular seal member 2 to deform in the radial direction D2. It is easy to establish the abutting of the outer periphery 21 of the annular seal member 2 against the inner peripheral wall 61 of the inner peripheral wall member 6 in a sufficient state again.

The manufacturing method of the seal structure 1 of the embodiment forms the seal groove 5 by the one end face 411 of the first main body 41, groove-body forming part 423 of the second main body 42 and flange part 424 of the second main body 42, by joining the first joint 412 of the first main body 41 and the second joint 422 of the second main body 42, and causes the annular seal member 2 in which the inner circumferential diameter R22 of the inner periphery 22 is substantially uniform along the axial direction D1 to fit over the groove-bottom forming part 423 from the side of the second joint 422. The inner periphery 22 of the annular seal member 2 is thereby made to abut the groove bottom 51, the inner circumferential diameter R22 of the inner periphery 22 is made to increase following an increase in the outer diameter R51 of the groove bottom 51, and the outer circumferential diameter R21 of the outer periphery 21 is also made to increase. The side of the outer periphery 21 of the annular seal member 2 having small outer circumferential diameter R21 is not made to abut the inner peripheral wall 61 of the inner peripheral wall member 6, and the side of the outer periphery 21 of the annular seal member 2 having large outer circumferential diameter R21 is made to abut the inner peripheral wall 61 of the inner peripheral wall member 6.

For this reason, according to the manufacturing method of the seal structure 1 of the embodiment, it is easy to arrange the annular seal member 2 in the seal groove 5 of the shaft member 4 consisting of the first main body 41 and second main body 42, in a state not causing the side of the outer periphery 21 of the annular seal member 2 having a small outer circumferential diameter to abut the inner peripheral wall 61 of the inner peripheral wall member 6, and causing the side of the outer periphery 21 of the annular seal member 2 having a large outer circumferential diameter to abut the inner peripheral wall 61 of the inner peripheral wall member 6.

A preferred embodiment of the present invention has been explained above. However, the present invention is not to be limited to the aforementioned embodiment, and can be implemented in various forms.

Modified Example

Figure 8:
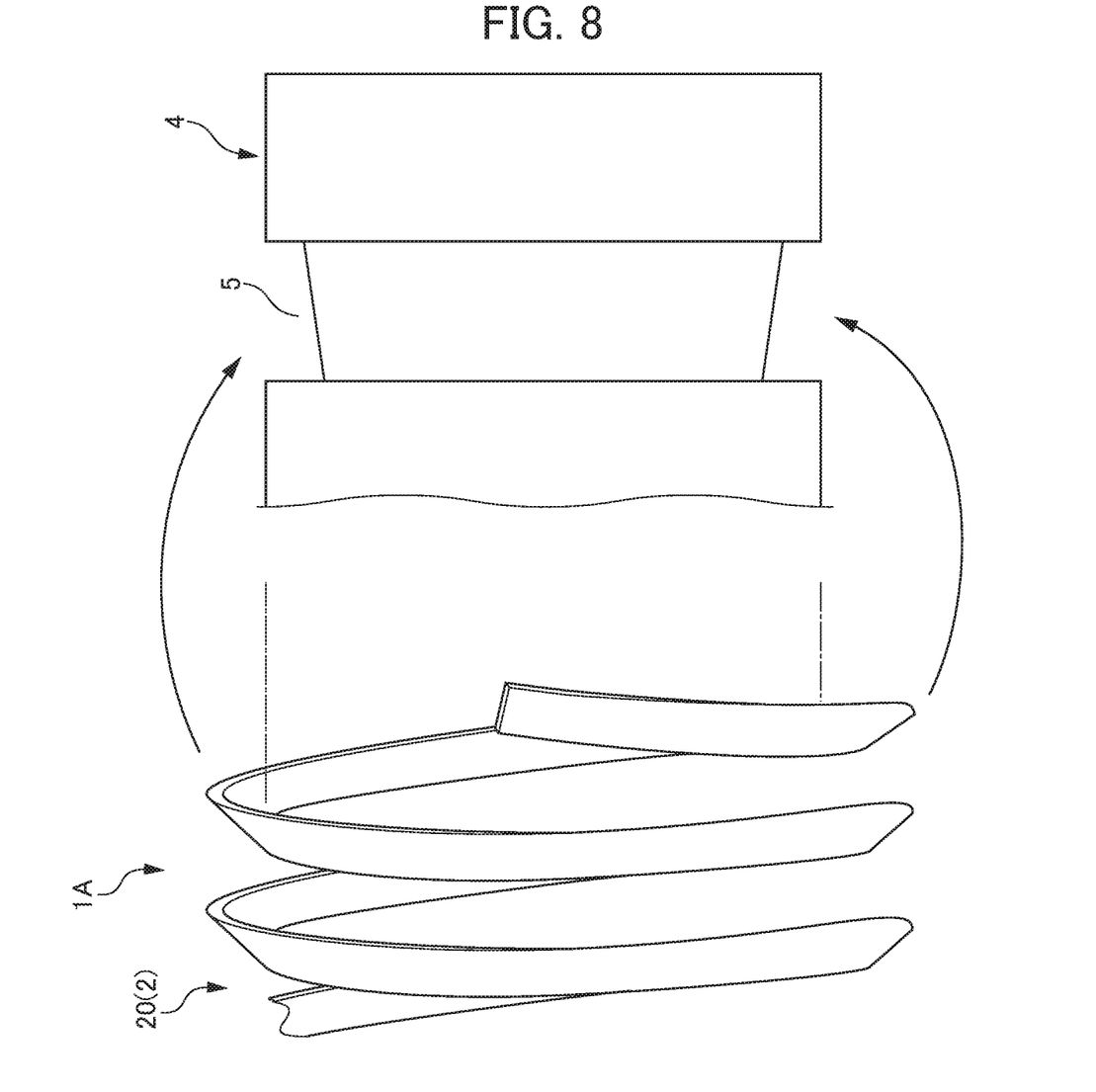
FIG. 8 is a view showing a sequence of arranging the annular seal member 2 in the seal groove 5 of a seal structure 1A according to a modified example of the present invention.

Next, a seal structure 1A of a modified example will be explained while referencing FIG. 8. FIG. 8 is a view showing a sequence of arranging the annular seal member 2 in the seal groove 5 of the seal structure 1A according to the modified example of the present invention. The modified example will be explained focusing on the points mainly differing from the embodiment. The explanation for the embodiment will be applied as appropriate to the points not particularly explained in the modified example. In addition, similar effects to the embodiment are exerted also in the modified example.

In the seal structure 1 of the aforementioned embodiment, the seal groove 5 of the shaft member 4 is formed by joining the first main body 41 and second main body 42. In contrast, as shown in FIG. 8, in the seal structure 1A of the modified example, the shaft member 4 is formed integrally, and for this reason, it is not possible to arrange the annular seal member 2 in the seal groove 5 by using joining process of the first main body 41 and second main body 42. For this reason, the annular seal member 2 is arranged in the seal member 5, by configuring to allow the annular seal member 20 to deform, and climb over the portion around the seal groove 5 of the shaft member 4.

Other Modified Examples

In the embodiment, the annular seal member 2 forms a spiral shape by a plurality of the ring-shaped parts 3 which are unclosed when viewing in the radial direction D2 being continuous in the axial direction D1. In contrast, in the present invention, the annular seal member may be formed by a plurality of the ring-shaped parts which are unclosed when viewed in the radial direction D2 overlapping in the axial direction D1. In the embodiment, the first joint 412 of the first main body 41 is configured from a female thread part, and the second joint 422 of the second main body 42 is configured from a male thread part; however, it is not limited thereto. The first joint 412 of the first main body 41 may be configured from the male thread part, and the second joint 422 of the second main body 42 may be configured from the female thread part. The first joint 412 of the first main body 41 and the second joint 422 of the second main body 42 may be a joining structure other than screw threads.

EXPLANATION OF REFERENCE NUMERALS 1 seal structure
2, 20 annular seal member
21 outer periphery
22 inner periphery
3 ring-shaped part
4 shaft member
41 first main body
411 one end face
412 female thread part, first joint
42 second main body
422 male thread part, second joint
423 groove-bottom forming part
424 flange part
5 seal groove
51 groove bottom
6 inner peripheral wall member
61 inner peripheral wall
62 internal space
D1 axial direction
D2 radial direction
R21 outer circumferential diameter
R22 inner circumferential diameter
R423 outer diameter
R51 outer diameter

The invention claimed is:
1. A seal structure comprising:
an annular seal member of ring shape having an outer periphery and an inner periphery;
a shaft member having a seal groove having a groove-bottom forming part at which the inner periphery of the annular seal member is disposed and an outer diameter of the groove-bottom forming part increases along an axial direction of the annular seal member; and
an inner peripheral wall member having an internal space encircled by an inner peripheral wall of the inner peripheral wall member, and arranging in the internal space the shaft member in which the annular seal member is disposed in the seal groove,
wherein the annular seal member is formed of a plurality of ring-shaped parts overlapping with each other in the axial direction of the annular seal member, which are closed or unclosed when viewed in a radial direction orthogonal to the axial direction,
wherein an entirety of the inner periphery of the annular seal member abuts the groove-bottom forming part, the outer diameter of which increases along the axial direction of the annular seal member, and an inner circumferential diameter of the inner periphery increases following an increase in the outer diameter of the groove-bottom forming part, whereby an outer circumferential diameter of the outer periphery also increases, and
wherein a first part of the outer periphery of the annular seal member having a first outer circumferential diameter does not abut the inner peripheral wall of the inner peripheral wall member, and a second part of the outer periphery of the annular seal member having a second outer circumferential diameter abuts the inner peripheral wall of the inner peripheral wall member, the first outer circumferential diameter being smaller than the second outer circumferential diameter, such that a contact state close to line contact is established between the outer periphery of the annular seal member and the inner peripheral wall of the inner peripheral wall member,
wherein the shaft member includes a first main body and a second main body,
wherein the first main body has a first joint at one end face thereof, wherein the second main body has a second joint which joins to the first joint of the first main body, the groove bottom forming part of conical shape which connects to the second joint, and a flange part which is connected to the groove-bottom forming part and spreads out in the radial direction so as to be wider than the outer diameter of the groove-bottom forming part, and wherein, in a state joining the first joint of the first main body and the second joint of the second main body, the seal groove is formed of the one end face of the first main body, the groove-bottom forming part of the second main body, and the flange part of the second main body.

2. The seal structure according to claim 1, wherein the annular seal member consists of fluororesin.

3. A manufacturing method of a seal structure that includes: an annular seal member of ring shape having an outer periphery and an inner periphery; a shaft member having a seal groove having a groove-bottom forming part at which the inner periphery of the annular seal member is disposed, an outer diameter of the groove-bottom forming part configured to increase along an axial direction of the annular seal member; and an inner peripheral wall member having an internal space encircled by an inner peripheral wall of the inner peripheral wall member, and arranging in the internal space the shaft member in which the annular seal member is disposed in the seal groove, wherein the annular seal member is formed of a plurality of ring-shaped parts overlapping with each other in the axial direction of the annular seal member, which are closed or unclosed when viewed in a radial direction orthogonal to the axial direction, wherein the shaft member includes a first main body and a second main body, wherein the first main body has a first joint at one end face thereof, wherein the second main body has a second joint which joins to the first joint of the first main body, the groove-bottom forming part of conical shape which connects to the second joint, and a flange part which is connected to the groove-bottom forming part and spreads out in the radial direction so as to be wider than the outer diameter of the groove-bottom forming part, and the method comprising:

forming the seal groove with the one end face of the first main body, the groove-bottom forming part of the second main body and the flange part of the second main body by way of joining the first joint of the first main body and the second joint of the second main body, and fitting the annular seal member, in which an inner circumferential diameter of the inner periphery is substantially uniform along the axial direction, over the groove-bottom forming part from an exterior of the second joint;

whereby an entirety of the inner periphery of the annular seal member is made to abut the groove-bottom forming part, the outer diameter of which increases along the axial direction of the annual seal member, along with the inner circumferential diameter of the inner periphery being made to increase following an increase in the outer diameter of the groove-bottom forming part, as well as increasing an outer circumferential diameter of the outer periphery; and whereby a first part of the outer periphery of the annular seal member having a first outer circumferential diameter is not made to abut the inner peripheral wall of the inner-peripheral wall member, and a second part of the outer periphery of the annular seal member having a second outer circumferential diameter is made to abut the inner peripheral wall of the inner-peripheral wall member, the first outer circumferential diameter being smaller than the second outer circumferential diameter, such that a contact state close to line contact is established between the outer periphery of the annular seal member and the inner peripheral wall of the inner peripheral wall member.

4. The manufacturing method of the seal structure according to claim 3, wherein the annular seal member consists of fluororesin.

* * * * *